(12) United States Patent
Awasthi et al.

(10) Patent No.: US 11,061,871 B2
(45) Date of Patent: Jul. 13, 2021

(54) DATA PLACEMENT FOR A DISTRIBUTED DATABASE

(71) Applicant: GOOGLE LLC, Mountain View, CA (US)

(72) Inventors: Ashish Awasthi, New York, NY (US); Julien Crozon, Jersey City, NJ (US); Xinfeng Li, Jersey City, NJ (US); Ziv Ayalon, New York, NY (US); Ye Zhou, Jersey City, NJ (US); Vladislav Adzic, New York, NY (US)

(73) Assignee: GOOGLE LLC, Mountain View, CA (US)

(*) Notice: Subject to any disclaimer, the term of this patent is extended or adjusted under 35 U.S.C. 154(b) by 166 days.

(21) Appl. No.: 16/355,112

(22) Filed: Mar. 15, 2019

(65) Prior Publication Data
US 2020/0293501 A1   Sep. 17, 2020

(51) Int. Cl.
*G06F 16/182* (2019.01)
*G06F 3/06* (2006.01)
*G06F 16/27* (2019.01)
*G06F 16/21* (2019.01)

(52) U.S. Cl.
CPC .......... *G06F 16/1844* (2019.01); *G06F 3/067* (2013.01); *G06F 3/0611* (2013.01); *G06F 3/0638* (2013.01); *G06F 3/0647* (2013.01); *G06F 16/214* (2019.01); *G06F 16/27* (2019.01)

(58) Field of Classification Search
CPC .... G06F 16/1844; G06F 16/214; G06F 16/27; G06F 16/278; G06F 3/0638; G06F 3/067; G06F 3/0647
See application file for complete search history.

(56) References Cited

U.S. PATENT DOCUMENTS

| | | | | |
|---|---|---|---|---|
| 7,899,763 | B2* | 3/2011 | Machulsky | G06F 3/0604 706/12 |
| 8,443,157 | B1* | 5/2013 | Reiner | G06F 3/0685 711/154 |
| 8,495,021 | B2 | 7/2013 | Srivastava et al. | |
| 9,015,229 | B1 | 4/2015 | Raz et al. | |
| 2010/0076933 | A1* | 3/2010 | Hamilton | G06F 3/067 707/640 |
| 2010/0131545 | A1* | 5/2010 | Srivastava | G06F 16/27 707/769 |

(Continued)

*Primary Examiner* — James E Richardson
(74) *Attorney, Agent, or Firm* — Brake Hughes Bellermann LLP

(57) ABSTRACT

According to an aspect, a method for data placement in a distributed database includes obtaining access pattern information relating to end clients that requested access to data stored in a first regional quorum of replicas located within a first region, where the first regional quorum includes a first lead replica. The method includes identifying a placement algorithm from a configuration file associated with the distributed database, and executing the placement algorithm to generate a suggested placement for the data based on the obtained access pattern information, where the suggested placement includes a second regional quorum of replicas located in a second region different than the first region, and the second regional quorum includes a second lead replica. The method includes transmitting a migration request to the distributed database to transfer the data from the first regional quorum to the second regional quorum.

20 Claims, 7 Drawing Sheets

(56) References Cited

U.S. PATENT DOCUMENTS

| | | | |
|---|---|---|---|
| 2012/0136697 A1* | 5/2012 | Peles | G06Q 10/0639 |
| | | | 705/7.38 |
| 2012/0173486 A1 | 7/2012 | Park et al. | |
| 2013/0151688 A1* | 6/2013 | Widjaja | G06F 9/5088 |
| | | | 709/224 |
| 2014/0149489 A1* | 5/2014 | Kathuria | H04L 67/1002 |
| | | | 709/203 |
| 2014/0281008 A1* | 9/2014 | Muthiah | H04L 65/607 |
| | | | 709/231 |
| 2015/0319063 A1* | 11/2015 | Zourzouvillys | H04L 41/5025 |
| | | | 370/352 |
| 2015/0319242 A1* | 11/2015 | Olster | G06F 11/2094 |
| | | | 707/634 |
| 2015/0381525 A1* | 12/2015 | Roese | H04W 4/02 |
| | | | 709/226 |
| 2016/0132518 A1* | 5/2016 | Muthukkaruppan | |
| | | | G06F 16/134 |
| | | | 707/623 |
| 2018/0069944 A1* | 3/2018 | Yang | H04L 67/1095 |
| 2018/0157654 A1* | 6/2018 | Dain | H04L 67/1097 |
| 2018/0167460 A1* | 6/2018 | Hsieh | G06F 16/2329 |
| 2019/0155937 A1* | 5/2019 | Barve | G06F 16/273 |
| 2019/0163391 A1* | 5/2019 | Annamalai | G06F 3/0653 |
| 2019/0199601 A1* | 6/2019 | Lynar | H04L 43/16 |
| 2020/0065513 A1* | 2/2020 | Sridharan | G06F 21/629 |

\* cited by examiner

US 11,061,871 B2

DATA PLACEMENT FOR A DISTRIBUTED DATABASE

TECHNICAL FIELD

Embodiments relate to a data placement mechanism for a distributed database.

BACKGROUND

A distributed database may store and replicate data in a number of geographical locations so that end users can access their data relatively quickly. Configuration of the data within the distributed database may have an impact on system performance such as the latency of serving data to the end users and/or the storage and replication costs.

SUMMARY

The embodiments provide a data placement system that intelligently generates and implements placement suggestions for worldwide access to a distributed database while balancing low latency and replica costs. The data placement system creates regional quorums of replicas for one or more separate groupings of data, and assigns data for individual rows to the regional quorums that are close to the locations they are accessed from.

According to an aspect, a method for data placement in a distributed database includes obtaining access pattern information relating to one or more end clients that requested access to data stored in a first regional quorum of replicas located within a first region, where the first regional quorum of replicas includes a first lead replica. The method includes identifying a placement algorithm from a configuration file associated with the distributed database, and executing the placement algorithm identified from the configuration file to generate a suggested placement for the data based on the obtained access pattern information, where the suggested placement includes a second regional quorum of replicas located in a second region different than the first region, and the second regional quorum of replicas includes a second lead replica. The method includes transmitting a migration request to the distributed database to transfer the data from the first regional quorum of replicas to the second regional quorum of replicas.

According to an aspect, an apparatus for data placement includes a distributed database having a first regional quorum of replicas with a first lead replica located within a first region, and a second regional quorum of replicas with a second lead replica located within a second region, wherein the distributed database stores a first row of data at the first regional quorum of replicas. The apparatus includes a data placement system includes a configuration file defining one or more database digests, and the configuration file identifies a placement algorithm for each database digest, and each database digest defines a separate grouping of data. The data placement system includes a place assigner configured to identify the placement algorithm for the first row of data from the configuration file and execute the placement algorithm to identify a suggested placement based on access pattern information relating to one or more end users that requested access to the first row of data, where the suggested placement includes the second regional quorum of replicas. The data placement system includes a place migrator configured to transmit a migration request to the distributed database to transfer the first row of data from the first regional quorum of replicas to the second regional quorum of replicas.

According to an aspect, a non-transitory computer-readable medium storing executable instructions that when executed by at least one processor are configured to cause the at least one processor to perform the operations of receiving a key value that identifies data stored in a distributed database, where the data is stored in the distributed database at a first regional quorum of replicas located within a first region, and the first regional quorum of replicas has a first lead replica. obtain access pattern information relating to one or more end clients that requested access to the data. The operations include identifies a placement algorithm from a configuration file associated with the distributed database, where the configuration file associates the placement algorithm with a database digest that defines a grouping of data that includes the data stored at the first regional quorum of replicas. The operations include executing the placement algorithm to identify a suggested placement for the data based on the access pattern information, where the suggested placement includes a second regional quorum of replicas located in a second region, and the second regional quorum of replicas includes a lead replica.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

DETAILED DESCRIPTION

In a distributed database, a set of replicas is used to store a large amount of data and serve a large number of requests coming from multiple geographical locations. For instance, a distributed database may include a strongly consistent database. In a strongly consistent database, writes require acceptance from the majority of replicas, i.e., a quorum. A lead replica performs the lead role in determining consensus from the quorum. In a strongly consistent database, updated data is passed on to all the replicas as soon as a write request arrives at one of the replicas. For instance, in a strongly consistent database, if a read/write request is received at a replica in a first geographical area (e.g., United States), but the lead replica is located in a second geographical location (e.g., Europe), the read/write request would need to travel a relatively long distance (e.g., over the ocean) in order to reach the lead replica because the lead replica performs the lead role in the consensus protocol. As such, strongly consistent databases may suffer from relatively high latencies.

A distributed database may include an eventually consistent database that may store different replicas of the data so that data can be served from the replica closest to the end user. However, since conventional methods do not necessarily determine the sources of the accesses, the eventually consistent database may maintain replicas for each user around the world in order to provide relatively low latency, which may result in relatively high costs of storage and replication.

This disclosure relates to systems and methods for configuring a large distributed database to configure placement of data within the distributed database. The systems and methods can generate and dynamically implement data placement suggestions in order to place data in a quorum of replicas within a certain region that i) receives a majority of the accesses to the data, and/or ii) is closest to one or more end clients associated with the data, and/or iii) is otherwise superior to other geographical areas based on heuristics such as storage capacity load balancing, replication bandwidth optimization, etc. As a result, the data placement may decrease the latency associated with retrieving the data in a strongly consistent database and/or decrease the replication and storage costs in an eventually consistent database. In addition, the system may be resilient to end users moving to different locations.

Figure 1:
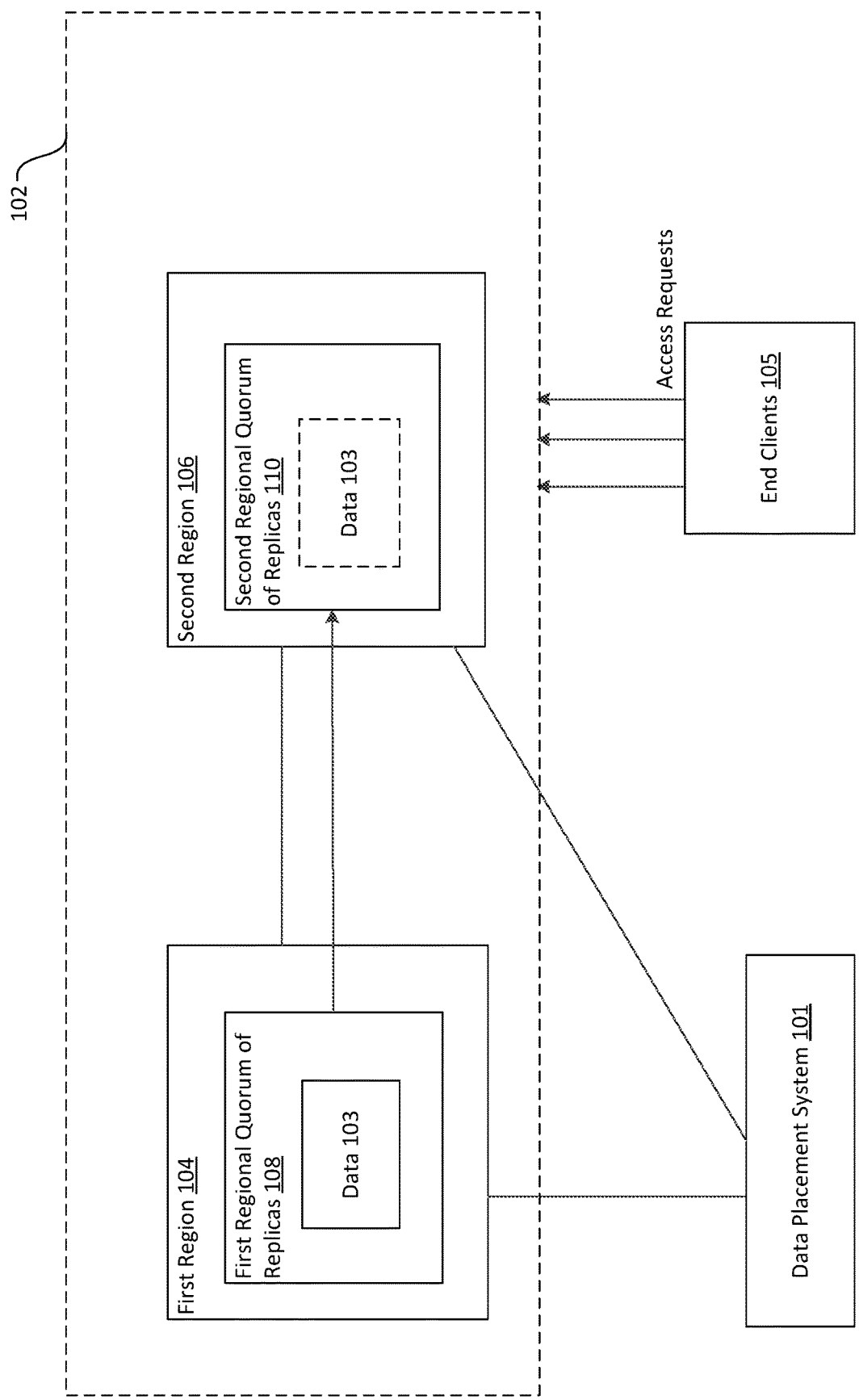
FIG. 1 illustrates a distributed database and a data placement system according to an aspect.

FIG. 1 illustrates a distributed database 102 and a data placement system 101 configured to generate and dynamically implement data placement suggestions for access (e.g., worldwide access) to the distributed database 102 according to an aspect. The data placement system 101 monitors accesses to data 103 stored in the distributed database 102, and dynamically generates a data placement suggestion to migrate the data 103 to another part of the distributed database 102 such that the data 103 is stored closer to the location it is commonly accessed from (and/or better optimized for storage capacity load balancing and/or replication bandwidth). In the description of FIG. 1, for ease of discussion, the data 103 is described as user data and placement of the data is based on data associated with the user. However, any field serving as the key to a table may be used to place the row data and implementations are not limited to data 103 that is user data.

The distributed database 102 includes a plurality of interconnected computing devices that can store data in multiple different geographical regions. In some examples, the distributed database 102 includes an application program interface (API) to migrate data from one set of replicas to another set of replicas. In some examples, the distributed database 102 is distributed to different regions of the world on a continental granularity (e.g., North America, South American, Europe, Asia, etc.) or a finer (or wider) granularity. In some examples, the distributed database 102 includes a strongly consistent database. In some examples, the distributed database 102 includes an eventually consistent database.

In some examples, the distributed database 102 includes a relational database. For example, the distributed database 102 may be a relational database that organizes data into one or more tables of columns and rows, and the distributed database 102 may support row-level data placement (e.g., data from different rows can be placed in different sets of replicas although they all belong to the same table virtually). In some examples, the distributed database 102 may enable the flexible placement of data of different end users since the distributed database 102 may use one or multiple rows to store a particular end user's data. In some examples, the distributed database 102 includes a non-relational database configured to support row-level data placement.

The data placement system 101 may create regional quorums of replicas (e.g., each having its own lead replica), and a separate quorum of replicas is assigned to each geographical region associated with the distributed database 102. For example, the distributed database 102 may be distributed over a first regional quorum of replicas 108 located within a first region 104 (e.g., United States), and a second regional quorum of replicas 110 located within a second region 106 (e.g., Europe). It is noted that the distributed database 102 may be distributed over more than two regions and according to any level of granularity. In some examples, the second region 106 may represent a different continent than the first region 104. In some examples, the second region 106 may represent a different location but on the same continent with respect to the first region 104.

The first quorum of replicas 108 may include one or more replicas (e.g., replica members). The first quorum of replicas 108 includes a lead replica configured to perform the lead role in the consensus protocol. The replica member(s) of the first quorum of replicas 108 may be one or more servers. The server(s) that define the first quorum of replicas 108 may be located within one or more data centers, and the data centers are located in the first region 104. In some examples, all of the replicas (including the lead replica) of the first quorum of replicas 108 are located in the first region 104.

The first quorum of replicas 108 may implement the consensus protocol in order to determine whether a distributed transaction (e.g., a read operation, write operation) is allowed to be performed within the distributed database 102. For example, the first quorum of replicas 108 may "vote" to reach a consensus in order to determine whether the distributed transaction is allowed to be performed within the distributed database 102. If a write transaction is received at a replica of the first quorum of replicas 108 and the first quorum of replicas 108 determines to allow the write transaction to write data to the distributed database 102, the data is stored and replicated at the replicas of the first quorum of replicas 108. In some examples, since the lead replica is located in the same region as the replica that received the write request, the latency (as compared with some conventional approaches) may be reduced.

The second quorum of replicas 110 may be the same as the first quorum of replicas 108 except that the second quorum of replicas 110 is located in a different geographical region. For example, the second quorum of replicas 110 includes one or more replica members, where one of the replica members is a lead replica configured to perform the lead role in the consensus protocol for database transactions received at the replica members of the second quorum of replicas 110. The second quorum of replicas 110 may be one or more servers, and the server(s) that define the second quorum of replicas 110 may be located within one or more data centers within the second region 106.

As shown in FIG. 1, the data 103 may be initially stored and replicated at the first quorum of replicas 108. The distributed database 102 may receive accesses (e.g., read/write requests) to the data 103 over a network (e.g., the Internet, a cellular network, a wide-area-network, etc.) from end clients 105, which is received at the distributed database 102 at one of the replica members of the first regional quorum of replicas 108 or the second regional quorum of replicas 110 (or any other regional quorum in another region).

In some examples, the data placement system 101 may determine that the source of the accesses is from the second region 106, and the data placement system 101 may generate a placement suggestion that indicates that the data 103 should be stored at the second regional quorum of replicas 110. For example, access pattern information (e.g., which data center(s) received the accesses and/or the location information of the end clients 105) may indicate that the majority of the accesses originate from the second region 106. The data placement system 101 may analyze the access pattern information and generate a placement suggestion that indicates that the data 103 should be assigned to the second regional quorum of replicas 110 so that the data 103 is stored and replicated at a location that is closer to the source of the accesses.

In some examples, the data placement system 101 may be configured as a placement service that can receive a key value that identifies the data 103 (e.g., a user identifier), and then provide placement suggestion for the data 103 according to the key value (e.g., user data for user A should be stored and replicated at the second regional quorum of replicas 110). In some examples, the data placement system 101 is configured to transmit the placement suggestions to an external system. In some examples, the data placement system 101 is configured to store the placement suggestions in a memory device associated with the data placement system 101. In some examples, the data placement system 101 is configured to migrate (e.g., transfer) the data 103 from the first regional quorum of replicas 108 to the second regional quorum of replicas 110, as shown in FIG. 1, so that the data 103 is stored and replicated at the second regional quorum of replicas 110 (not the first regional quorum of replicas 108).

The latency may be minimized by creating regional quorums and transferring data intelligently and dynamically in these regional quorums (e.g., assigning the data 103 to one regional quorum that is closest to the sources of the accesses or the location of the end clients 105). As a result, the lead replica of the regional quorum is located relatively close to the source(s) of the accesses, thereby decreasing the latency. In some examples, the data placement system 101 can be considered to exploit the property of localized access for individual end users and assign the user data to specific regional quorums based on that property.

The end clients 105 may include smartphones, laptop computers, desktop computers, internet of things devices, home-based devices (e.g., streaming devices), gaming consoles, wearable devices (watches, glasses, etc.) or generally type of computing device configured to read or write the data 103 to the distributed database 102. In some examples, the end clients 105 may be one or more servers, which serve requests on behalf of end users or on behalf of other servers.

In some examples, the data 103 includes user data that is associated, with user permission, with one or more applications used by a user of one or more of the end clients 105. The data 103 may be specific to a particular user or related to a class of users. In some examples, the data 103 may refer to user-specific data contained in a single row of a table of the distributed database 102. In some examples, the data 103 may refer to user-specific data contained in multiple rows of the distributed database 102. Email services, calendar services, photo, services, video services, and other types of user data services may store user-specific data, with user permission, for each user (which may number as high as several billion) on the distributed database 102. In some examples, the data 103 may be specific to a particular physical device related to a particular user or related to a class of users. In some examples, the number of the end clients 105 may range from hundreds to billions. In some examples, the data placement system 101 can dynamically move user-specific data (e.g., at the granularity of a single end user) between the quorums of replicas.

In some examples, the data 103 includes application data (e.g., source code, configuration file(s), saved interactions with the application data, etc.). For example, the data 103 may relate to a software application (or a portion thereof) that executes on a server in a certain geographical region. However, a relatively large number of accesses to the software application may stem from a different geographical area. In some examples, the data placement system 101 may programmatically suggest or physically migrate the application data to a portion of the distributed database 102 that is in the second geographical location that is close to the source of the accesses and/or the location of the users in order to decrease the latency associated with retrieving the user data and/or decrease the replication costs.

Figure 2:
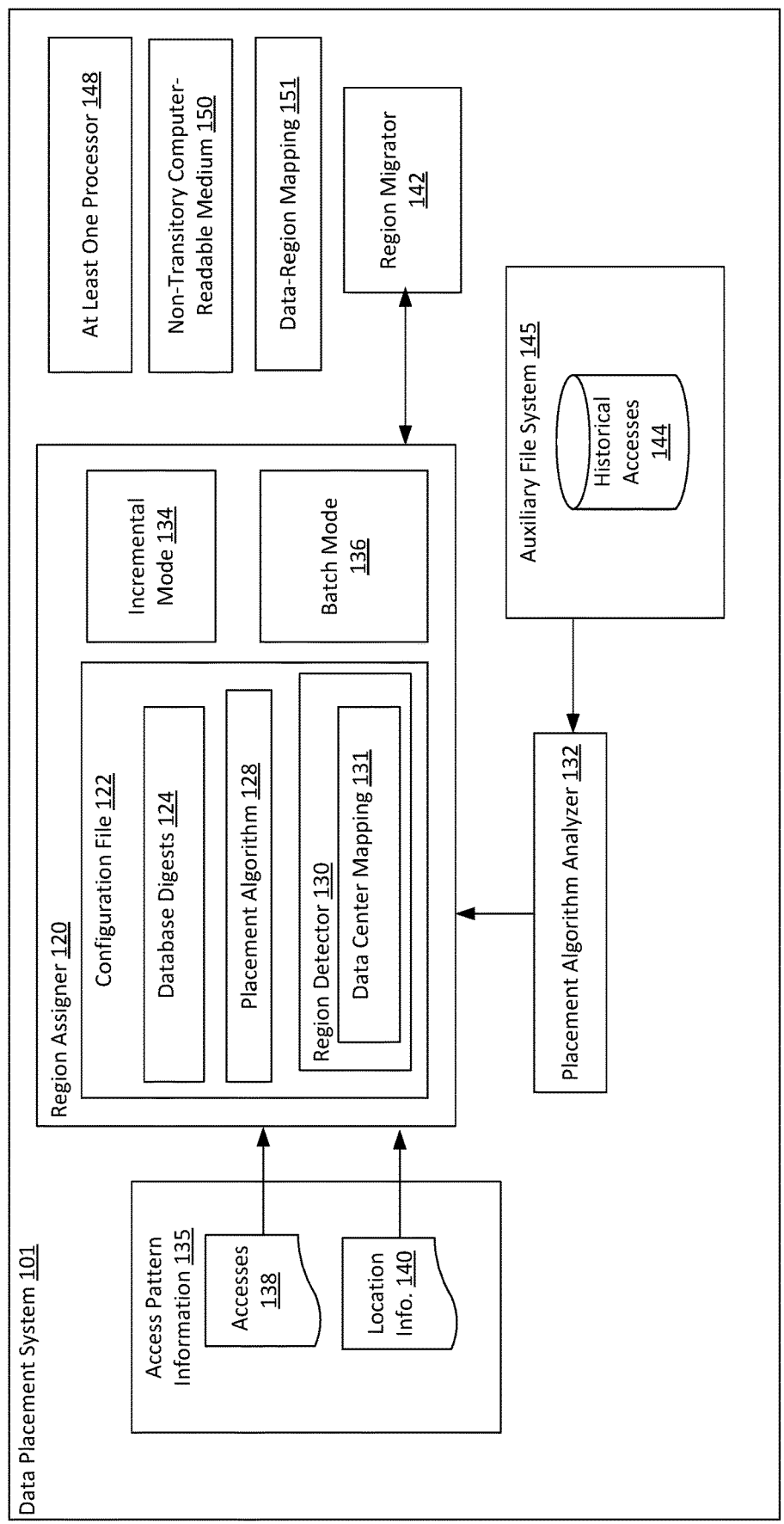
FIG. 2 illustrates the data placement system according to an aspect.

FIG. 2 illustrates a block diagram of the data placement system 101 according to an aspect. The data placement system 101 includes a region assigner 120 configured to generate a database placement suggestion for the data 103 stored in the distributed database 102. The placement suggestion may be based on access pattern information 135. The access pattern information 135 may include information on which region the accesses are received at the distributed database 102 from the end clients 105 and/or the locations of the end clients 105 that originated the access requests. For example, the access pattern information 135 may include accesses 138 to the data 103, and, with user permission, location information 140 of the end clients 105 that requested access to the data 103.

In some examples, each access 138 includes information on the access source, such as which data center received an access 138. For example, if an access 138 is received at a data center in Belgium, the data placement system 101 may determine that the access source is from Europe. In the examples, the location information 140 may include an Internet protocol (IP) address and/or global positioning system (GPS) information regarding the end clients 105 that provided the accesses 138. In some examples, the location information 140 includes location data of the end client 105 that is associated with a user account of a user. For example, for some home-based devices, the registration process includes the submission of a location of the home-based device in order to register the device (or the user provides permission to automatically provide the address of the device).

The data placement system 101 includes a configuration file 122 that defines one or more database digests 124 for the distributed database 102. In some examples, the configuration file 122 may define all the database digests 124 that pertain to the distributed database 102, which may be one, two, or more than two. Each database digest 124 may define a separate grouping of similar data. For instance, one database digest 124 may relate to data of a first type (e.g., search results), and another database digest 124 may relate to data of a second type (e.g., home device accesses), and so forth.

The configuration file 122 may define, for each database digest 124, the regional quorums where data can be stored. In some examples, for a given database digest 124, the configuration file 122 may define the regional quorums as: US (aa, bb, cc), EU (dd, ee), and Asia (ff), where US, EU, and Asia may be identifiers that identify the regions, and the two-letter string represents the data center included within that region. As such, the configuration file 122 may define the regional quorums differently for different database digests 124. In some examples, the configuration file 122 may define the database digests 124 as including a first database digest and a second database digest.

For the first database digest, the configuration file 122 may define the first regional quorum of replicas 108 in the United States (e.g., the first region 104) with its replicas being located in data centers at different locations in the United States, and the second regional quorum of replicas 110 in Europe (e.g., the second region 106) with its replicas being located in data centers at different locations in Europe.

For the second database digest, the configuration file 122 may define the first regional quorum of replicas 108 in the United States (or a different geographical area) with its replicas being located at different locations in the United States (which may be the same or different than the ones identified for the first database digest), and the second regional quorum of replicas 110 in Europe with its replicas being located in data centers at different locations in Europe (which may be the same or different than the ones identified for the second database digest).

In some examples, for each database digest 124, the configuration file 122 may define a default regional quorum of replicas to store data in the distributed database 102. For example, the data placement system 101 may be unable to assign a regional quorum for a subset of users for a particular database digest 124 because the number of accesses 138 associated with each of these users is below a threshold level and/or the location information 140 is unknown.

The configuration file 122 may define a region detector 130 configured to generate and update a data center mapping 131 that maps data centers to regions for each database digest 124. As such, the configuration file 122 may identify one or more data centers that are included within and/or related to each region for each database digest 124. The region detector 130 may identify the data center belonging to a certain region based on network weights. In some examples, the network weights include network round-trip time (RTT). For example, the distance between a data center and a region may be calculated as a mean of RTTs from the data center to all other data centers defined in that region. In some examples, the region detector 130 may map the data center to the region with the shortest distance, for each database digest 124. The region detector 130 may store the data center mapping 131 in memory for fast lookup. In some examples, in response to the configuration or the network weights changing, the region detector 130 is configured to update the data center mapping 131 by recalculating the distances of data centers and regions.

The configuration file 122 may identify a placement algorithm 128 to use for each database digest 124. Since the configuration file 122 may identify a specific placement algorithm 128 on a per database digest basis (or per grouping of data), the generated placement suggestion may be more accurate (as compared to some conventional approaches) because the placement algorithm 128 identified for a particular database digest 124 may be optimized for access patterns for data represented in that particular database digest 124 (e.g., in an offline mode as discussed later in the disclosure). The configuration file 122, for each database digest 124, may store one or more parameters that have been optimized for a respective database digest 124.

The placement algorithm 128 may be an algorithm that receives the access pattern information 135, and generates a suggested placement of the data 103 in the distributed database 102 (e.g., which regional quorum the data 103 should be stored and replicated at). In some examples, using the access pattern information 135, the placement algorithm 128 is configured to determine the region that receives a majority of the accesses 138 to the data 103 and/or is closest to one or more of the end clients 105 that originated the accesses 138 to the data 103. In some examples, accesses 138 that are received at any of the replicas or data centers of the first regional quorum of replicas 108 may be considered as being received or originating from the first region 104. Similarly, accesses 138 that are received at any of the replicas or data centers of the second regional quorum of replicas 110 may be considered as being received or originating from the second region 106. In some examples, the placement algorithm 128 is configured to use other metrics/factors for assigning the data 103 to a particular regional quorum such as storage capacity load balancing, replication bandwidth optimization, and/or migration costs.

In some examples, the placement algorithm 128 includes an anomalous access based placement algorithm that determines a number (k) of anomalous accesses in a set period of time (n) for the data 103 stored in the distributed database 102 (using the accesses 138), and if the number (k) of anomalous accesses within the set period of time (n) is greater than a threshold number and the data 103 has not been migrated in less than a set period of time (m), the placement algorithm 128 may suggest or automatically initiate migration of the data 103 to the region where the anomalous accesses 138 are arriving from (which may be the second regional quorum of replicas 110).

An access is considered anomalous if it arrives at a replica or data center from a region other than the region assigned to the data 103 (e.g., it represents a location miss). For example, if the data 103 is assigned to the first regional quorum of replicas 108 (e.g., the first region 104), any accesses 138 received at the data centers of the second regional quorum of replicas 110 are considered anomalous because they are received at a region different than what is assigned to the data 103. The placement algorithm 128 determines the number (k) of anomalous accesses that occur within the set period of time (n) (e.g., 1 day, 3 days, 1 week, etc.). If the number (k) of anomalous accesses is equal to or greater than a threshold level, and the data 103 has not been migrated in less than the set period of time (m), the placement algorithm 128 may identify the second regional quorum of replicas 110 as the placement suggestion for the data 103. In some examples, the value for the parameter (k), the parameter (n), and/or the parameter (m) may assist with preventing the data 103 from being transferred too frequently (e.g., avoid "ping-ponging" the data 103 between quorums).

In some examples, the placement algorithm 128 is a user location based placement algorithm that obtains the location information 140 associated with the location of the end clients 105 (e.g., GPS information, IP addresses etc.) and then assigns a regional quorum based on the location information 140. In some examples, the data 103 may be accessed by end clients 105 that are known to be relatively stationary. In some examples, the data 103 relates to user data regarding a home-based device, and the location information 140 of the end client 105 is used to determine the placement of the data 103. In some examples, assuming that the data 103 is initially assigned to the first regional quorum of replicas 108, the placement algorithm 128 may obtain the location information 140 of one or more of the end clients 105 that accessed the data 103, and if the location information 140 indicates that the end client 105 is located within the second region 106, the placement algorithm 128 may identify the second regional quorum of replicas 110 as the region to store the data 103.

The configuration file 122, for each database digest 124, may identify the placement algorithm 128 to use for determining placements. For example, for the first database digest, the configuration file 122 may identify the user location based placement algorithm to use for data pertaining to the first database digest. For example, the first database digest may relate to data from home devices, and the user location based placement algorithm may be a more accurate algorithm to use on that type of data. For the second database digest, the configuration file 122 may identify the anomalous access based placement algorithm to use for data pertaining to the second database digest. In some examples, the configuration file 122 identifies one or more parameters (e.g., values of parameters k, n, and m) that have been optimized for the second database digest.

In some examples, the configuration file 122 may identify the anomalous access based placement algorithm for both the first database digest and the second database digest, but the values of parameters of k, n, and m may be different for the first and second database digests. For example, the configuration file 122 may store the values of parameters k, n, and m that have been optimized in an offline mode for the first database digest, and the configuration file 122 may store the values of parameters k, n, and m that have been optimized in an offline mode for the second database digest.

The data placement system 101 includes a placement algorithm analyzer 132 configured to analyze one or more placement algorithm 128 for a particular database digest 124, and store the results in the configuration file 122, where the results indicate which placement algorithm 128 to use for a particular database digest 124 and the parameters of the placement algorithm 128.

Figure 3:
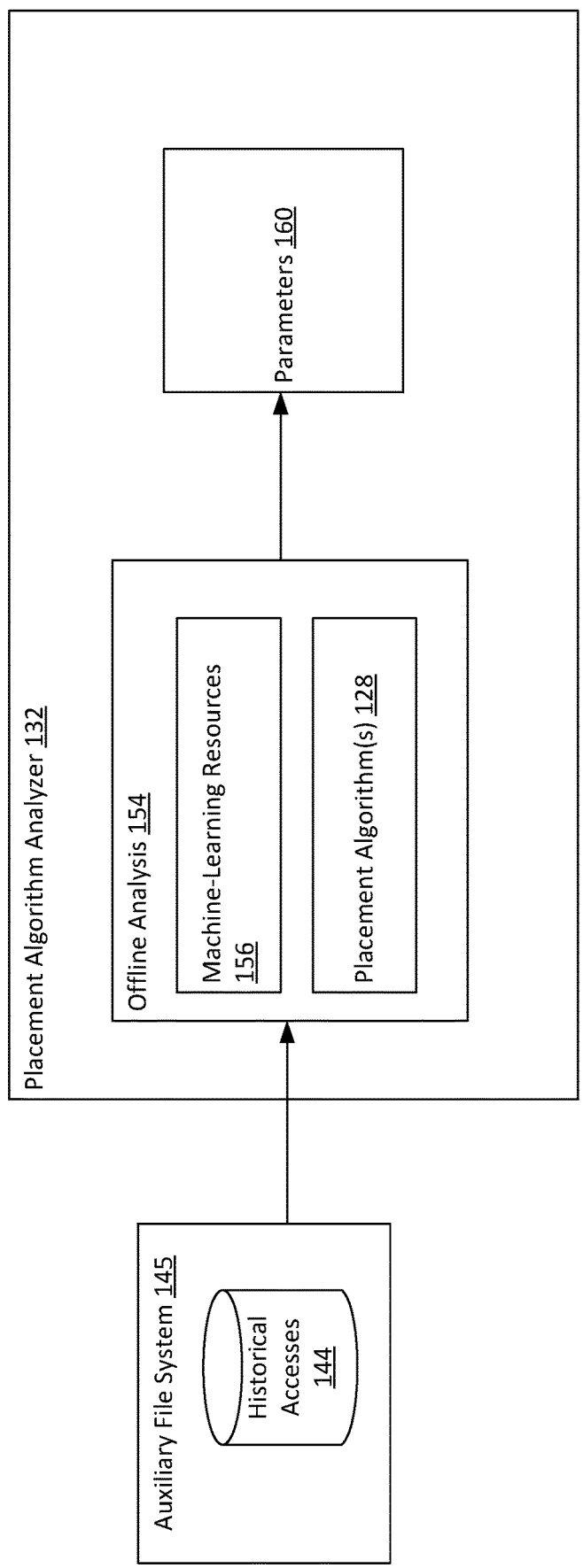
FIG. 3 illustrates a perspective of a placement algorithm analyzer of the data placement system according to an aspect.

FIG. 3 illustrates a perspective of the placement algorithm analyzer 132 according to an aspect. One or more placement algorithms 128 (and its parameters) are evaluated in an offline analysis 154 for each database digest 124 using the historical accesses 144, and the results of the offline analysis 154 are stored in the configuration file 122. In some examples, the results of the offline analysis 154 include an identification of the placement algorithm 128 to use for a particular database digest 124. In some examples, the results of the offline analysis 154 include one or more parameters 160 that have been optimized for a particular database digest 124. In some examples, the parameters 160 are the values for the parameters k, n, and m for the anomalous access based placement algorithm.

The historical accesses 144 may be accesses to the distributed database 102 that are sampled and logged in an auxiliary file system 145. In some examples, to the extent the user consents to the use of such data, the historical accesses 144 are a sample of user accesses to the distributed database 102. In some examples, the historical accesses 144 include when and where the access happened and which data was accessed. For example, a logged historical access 144 may indicate a timestamp (e.g., Unix timestamp) providing time information that indicates when the access occurred. A logged historical access 144 may identify the location of where the access happened (e.g., the access request was received at data center aa, or the access request was received at replica b, etc.). A logged historical access 144 may also identify the data that was accessed.

In some examples, the offline analysis 154 includes one or more simulations on the historical accesses 144 that evaluate the parameters 160 for a particular database digest 124 such that values for the parameters 160 are determined to minimize latency and/or reduce replication and storage costs and/or prove optimal according to some other metric. For instance, a reduction in the latency may mean that the accesses originate closer to the region in the distributed database 102 that stores the data 103. In some examples, the placement algorithm 128 is anomalous access based placement algorithm, and the placement algorithm analyzer 132 is configured to determine the values of k, n, and m in a manner that optimizes access to the distributed database 102 in terms of latency or storage and replication cost (or a combination of both).

In some examples, the placement algorithm analyzer 132 includes machine-learning resources 156 (e.g., supervised or unsupervised) to perform the offline analysis 154, where the machine-learning resources 156 are configured to determine the parameters 160 of the placement algorithm 128 (or select a particular placement algorithm 128) that optimizes access to the distributed database 102 in terms of latency and/or storage and replication cost. In some examples, the placement algorithm analyzer 132 uses a neural network to perform the offline analysis 154. The neural network may be an interconnected group of nodes, each node representing an artificial neuron. The nodes are connected to each other in layers, with the output of one layer becoming the input of a next layer. Neural networks transform an input, received by the input layer, transform it through a series of hidden layers, and produce an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process.

In some examples, the placement algorithm analyzer 132 uses a convolutional neural network in the offline analysis 154, which is a neural network that is not fully connected. Convolutional neural networks therefore have less complexity than fully connected neural networks. Convolutional neural networks can also make use of pooling or maxpooling to reduce the dimensionality (and hence complexity) of the data that flows through the neural network and thus this can reduce the level of computation required. This makes computation of the output in a convolutional neural network faster than in neural networks.

In some examples, the placement algorithm analyzer 132 may perform a simulation on the historical accesses 144 using the default region of the data (e.g., the default region may be the first regional quorum of replicas 108). The placement algorithm analyzer 132 may calculate the latency based on the distance between the replica that received the access request and the region. After a certain number of access logs (e.g., which may depend on the type of placement algorithm 128), the data may be assigned and moved to another region. Then, the placement algorithm analyzer 132 may calculate the latency based on the distance between the replica that received the access request and the other region. Another simulation may be performed with respect to different values for the parameters 160 (or according to a different placement algorithm 128), and another simulation may be performed with respect to different values for the parameters 160 (or according to a different placement algorithm 128), and so forth. The placement algorithm analyzer 132 may aggregate the calculated latencies and compare the performance gain and loss statistically in terms of latency change in various percentiles, percentage of end clients 105 that receive latency improvement or loss, percentage of data that is moved, etc.

In some examples, the offline analysis 154 includes one or more simulations on the historical accesses 144 that evaluate multiple placement algorithms 128. For example, the placement algorithm analyzer 132 may compute a first estimation of latency for access to data of the database digest 124 according to a first placement algorithm, a second estimation of latency for access to the data 103 according to a second placement algorithm, and a third estimation of latency for access to the data 103 according to a third placement algorithm. In some examples, the placement algorithm analyzer 132 may select one of these placement algorithms for the database digest 124 based on the first, second, and third estimations of latency (e.g., selects the one with lowest latency). In some examples, the placement algorithm analyzer 132 uses factors other than (or in addition to) latency (e.g., storage and replication costs).

Referring back to FIGS. 1 and 2, in an online migration mode, the region assigner 120 may determine the placement algorithm 128 (and associated parameters that have been tuned to the database digest 124 applicable to the data 103) from the configuration file 122 and execute the determined placement algorithm 128 to identify a suggested placement for the data 103 based on the access pattern information 135. If the output of the placement algorithm 128 indicates that the data 103 should be assigned to the second quorum of replicas 110, a region migrator 142 may notify a real-time notification system of the current placement and/or transmit a migration request to the distributed database 102 to transfer the data 103 from the first regional quorum of replicas 108 to the second regional quorum of replicas 110 such that the data 103 is stored and replicated in the distributed database 102 at the second regional quorum of replicas 110 (not the first regional quorum of replicas 108).

In some examples, the region assigner 120 operates an incremental mode 134 in which the region assigner 120 monitors the recent access pattern information 135, and generates real-time placement suggestions based on the specified placement algorithm 128 in the configuration file 122. In some examples, the region assigner 120 operates in a batch mode 136 in which multiple servers read a large amount of access logs or other input signal data, and generates placement suggestions based on a specific placement algorithm 128 in the configuration file 122 for all relevant data. For example, to initialize a new database, the data placement system 101 may receive a request to provide suggested region placement for rows based on system logs.

The region migrator 142 may be configured to receive the database placement suggestion, and if the database placement suggestion identifies a place that is different than the current placement of the data 103, the region migrator 142 is configured to transmit a migration request to the distributed database 102 to transfer the data 103 to the place identified by the database placement suggestion.

In some examples, the data placement system 101 is configured to generate and update a data-region mapping 151 that maps key values of data to the regional quorums. In some examples, the key values may be user identifiers. However, the data-region mapping 151 may be keyed to other key values besides user identifiers. The data-region mapping 151 may initially map the key value of the data 103 to the first regional quorum of replicas 108. Then, after the data placement system 101 transfers the data 103 to the second regional quorum of replicas 110, the data placement system 101 may update the data-region mapping 151 to map the key value of the data 103 to the second regional quorum of replicas 110. In some examples, the data placement system 101 is configured to distribute the data-region mapping 151 to the quorums, where each region quorum would store a copy of the data-region mapping 151.

In some examples, the data-region mapping 151 may include a lock flag for one or more entries in the data-region mapping 151. For example, one of the entries of the data-region mapping 151 may be the mapping of the data 103 to the first regional quorum of replicas 108, and this entry includes a lock flag. The lock flag may indicate that the data 103 is not to be migrated from the first regional quorum of replicas 108. In some examples, the lock flag can be used to comply with local laws/regulations, avoid spurious accesses (e.g., if the user is programmatic (a robot)), etc.

The data placement system 101 includes one or more processors 148 formed in a substrate configured to execute one or more machine executable instructions or pieces of software, firmware, or a combination thereof. The processors 148 can be semiconductor-based—that is, the processors can include semiconductor material that can perform digital logic. The data placement system 101 includes a non-transitory computer-readable medium 150. The non-transitory computer-readable medium 150 includes a memory that may include any type of storage device that stores information in a format that can be read and/or executed by the one or more processors 148. The non-transitory computer-readable medium 150 may include volatile memory, non-volatile memory, or a combination thereof, and store modules that, when executed by the one or more processors 148, perform the operations discussed herein.

Figure 4:
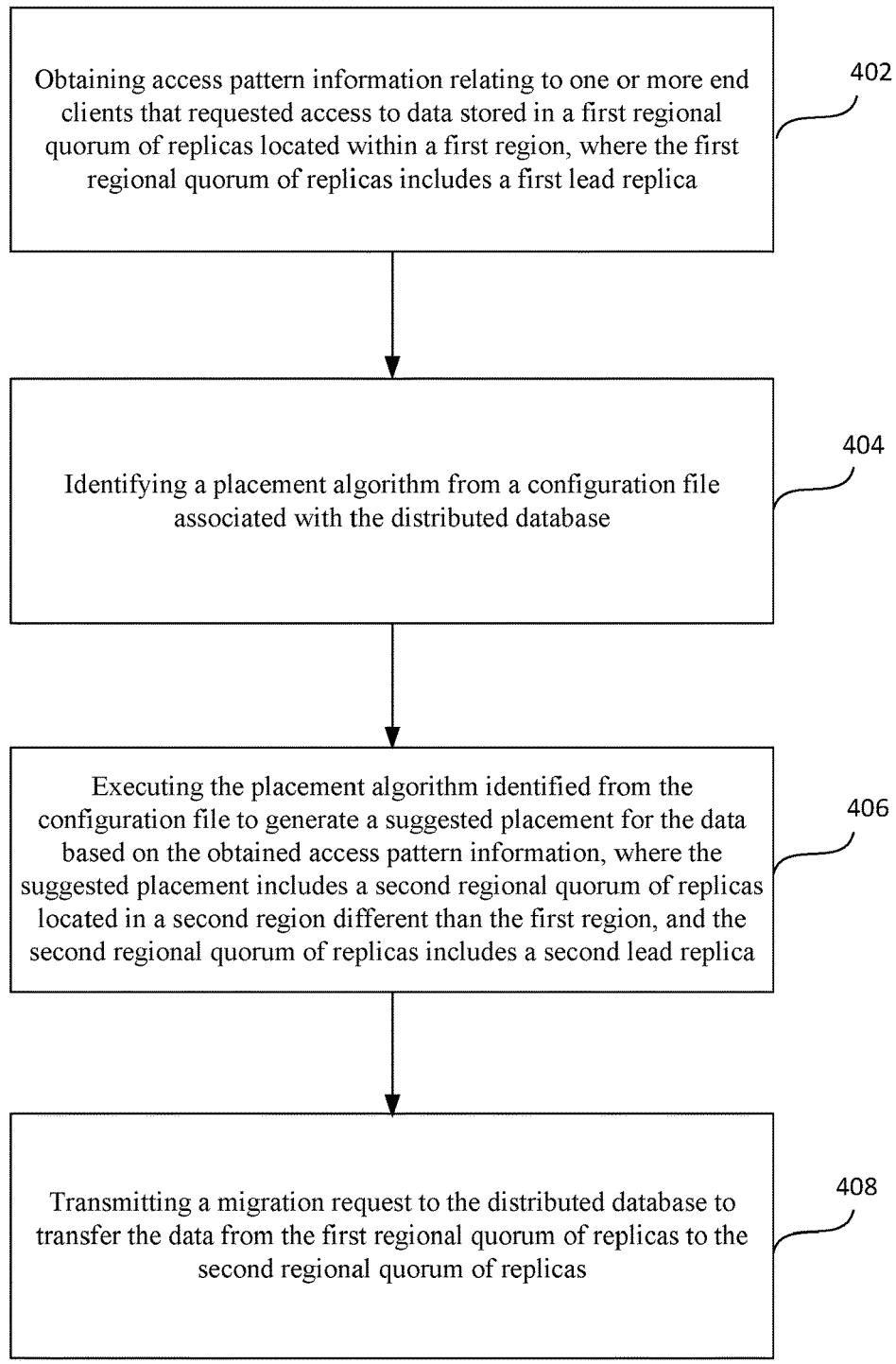
FIG. 4 illustrates a flowchart depicting example operations of the data placement system according to an aspect.

FIG. 4 illustrates a flowchart 400 depicting example operations of the data placement system 101 according to an aspect. The data placement system 101 is configured to transfer data between regional quorums of replicas so that the data is stored and replicated at a quorum of replicas that is closer to the access sources.

Operation 402 includes obtaining access pattern information 135 relating to one or more end clients 105 that requested access to the data 103, where the data 103 is stored in the distributed database 102 at a first regional quorum of replicas 108 located within a first region 104. In some examples, each access 138 includes information on the access source such as which data center received an access 138. In the examples, the location information 140 includes IP addresses, GPS information, and/or location data known about the end clients 105. In some examples, the data 103 includes user-specific data relating to a particular user that may be stored in one or multiple rows of a table of the distributed database 102. In some examples, the data 103 includes data relating to items, such as digital files, that may be stored in one or multiple rows of a table of the distributed database 102. In these examples the placement of a digital file may be based on accesses by multiple users.

Operation 404 includes identifying a placement algorithm 128 from a configuration file 122 associated with the distributed database 102. In some examples, the configuration file 122 defines a plurality of database digests 124, where each database digest 124 defines a separate grouping of data. The configuration file 122 may identify, for each database digest 124, the placement algorithm 128 and associated parameters 160. In some examples, the values for the parameters 160 are determined in an offline analysis 154 that uses machine-learning resources 156. As such, the configuration file 122 may store, for each database digest 124, the values for the parameters 160, which have been optimized (offline) for a respective database digest 124.

Operation 406 includes executing the placement algorithm 128 identified from the configuration file 122 to generate a suggested placement for the data 103 based on the obtained access pattern information 135, where the suggested placement includes a second regional quorum of replicas 110 located in a second region 106 different than the first region 104, and the second regional quorum of replicas 110 includes a second lead replica. In some examples, the placement algorithm 128 includes the anomalous access based placement algorithm. In some examples, the placement algorithm 128 includes the location-based algorithm.

Operation 408 includes transmitting a migration request to the distributed database 102 to transfer the data 103 from the first regional quorum of replicas 108 to the second regional quorum of replicas 110 such that the data 103 is stored in the distributed database 102 at the second regional quorum of replicas 110. For example, the region migrator 142 may be configured to receive the database placement suggestion, and if the database placement suggestion identifies a place that is different than the current placement of the data 103, the region migrator 142 is configured to transmit a migration request to the distributed database 102 to transfer the data 103 to the place identified by the database placement suggestion.

Figure 5:
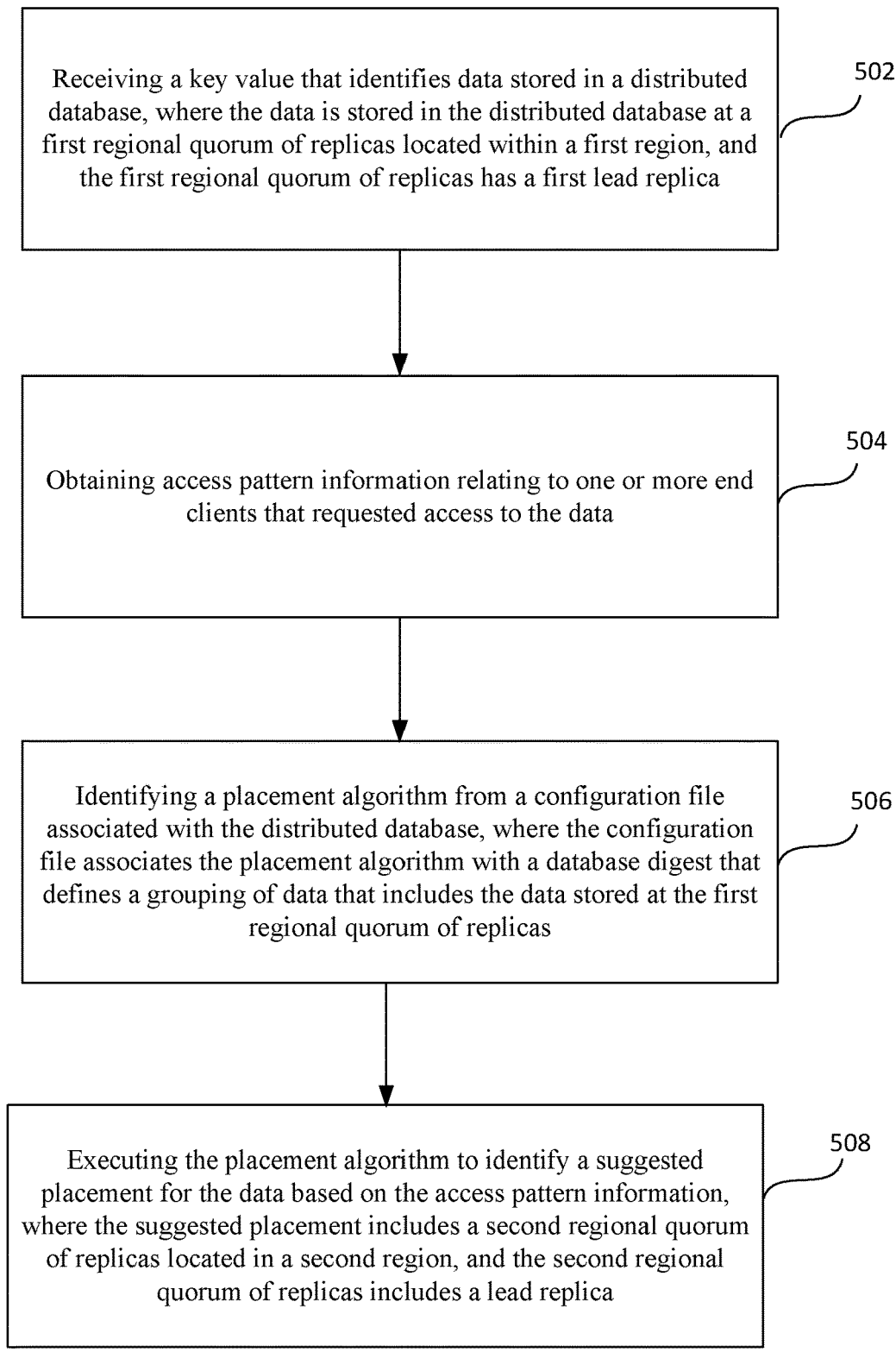
FIG. 5 illustrates a flowchart depicting example operations of the data placement system according to another aspect.

FIG. 5 illustrates a flowchart 500 depicting example operations of the data placement system 101 according to an aspect. For example, the data placement system 101 may be a data placement service that can receive a key value that identifies the data 103 (e.g., a user identifier), and then provide a placement suggestion for the data 103 according to the key value. The data placement system 101 may transmit the placement suggestions to an external system and/or store the placement suggestions in a memory device associated with the data placement system 101.

Operation 502 includes receiving a key value that identifies data 103 stored in a distributed database 102, where the data is stored in the distributed database 102 at a first regional quorum of replicas 108 located within a first region 104, and the first regional quorum of replicas 108 has a first lead replica. In some examples, the key value is a user identifier, and the data 103 is a row of data within a table of the distributed database 102.

Operation 504 includes obtaining access pattern information 135 relating to one or more end clients 105 that requested access to the data 103.

Operation 506 includes identifying a placement algorithm 128 from a configuration file 122 associated with the distributed database 102. The configuration file 122 associates the placement algorithm 128 with a database digest 124 that defines a grouping of data that includes the data 103 stored at the first regional quorum of replicas 108.

Operation 506 includes executing the placement algorithm 128 to identify a suggested placement for the data 103 based on the access pattern information 135, where the suggested placement includes a second regional quorum of replicas 110 located in a second region 106, and the second regional quorum of replicas includes a lead replica. In some examples, the operations of the flowchart 500 also include transmitting the suggested placement to an external system and/or storing the suggested placement in a memory device associated with the distributed database 102.

Figure 6:
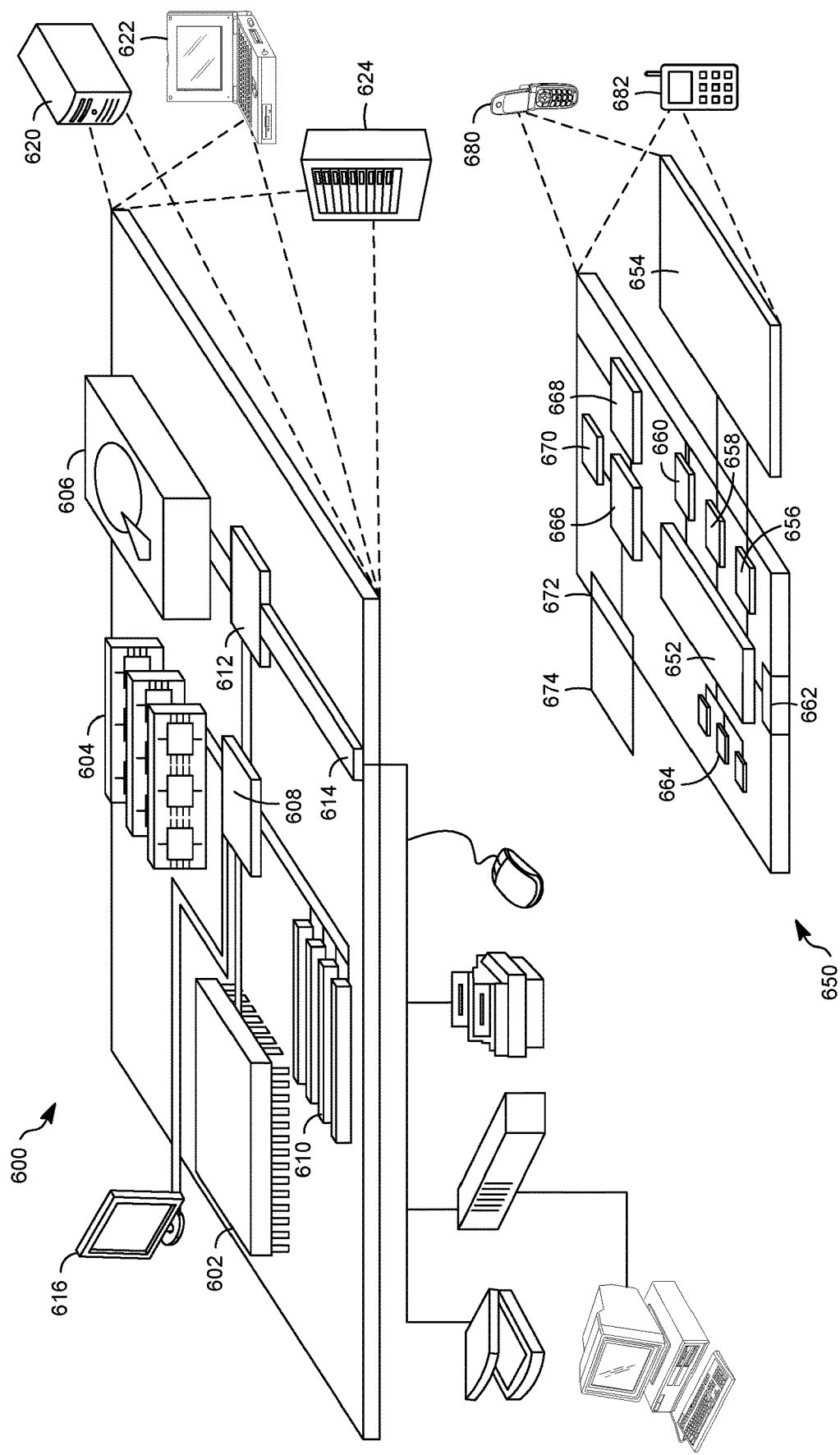
FIG. 6 shows an example of a computer device and a mobile computer device according to an aspect.

FIG. 6 shows an example of a computer device 600 and a mobile computer device 650, which may be used with the techniques described here. Computing device 600 is intended to represent various forms of digital computers, such as laptops, desktops, workstations, personal digital assistants, servers, blade servers, mainframes, and other appropriate computers. In some examples, the computer device 600 is an example of the data placement system 101, the distributed database 102, and/or the end clients 105. Computing device 650 is intended to represent various forms of mobile devices, such as personal digital assistants, cellular telephones, smart phones, and other similar computing devices. In some examples, the computing device 650 is an example of the end clients 105. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some examples, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650. The computing device 650 may be implemented in a number of different forms, as shown in the figure. For example, it may be implemented as a cellular telephone 680. It may also be implemented as part of a smart phone 682, personal digital assistant, or other similar mobile device.

Figure 7:
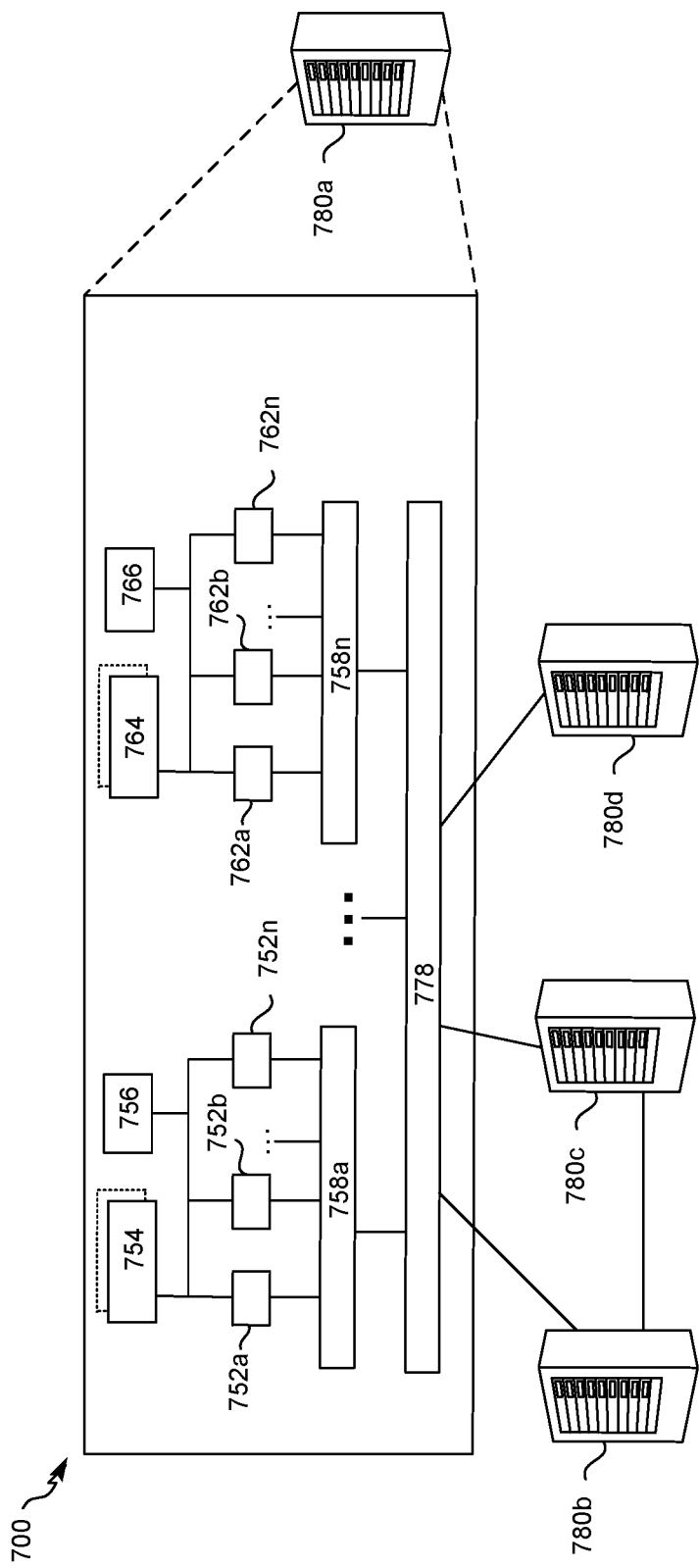
FIG. 7 shows another example of a computer device according to an aspect.

FIG. 7 shows an example of a generic computer device 700, which may be database 102 or data placement system 101 of FIG. 1, which may be used with the techniques described here. Computing device 700 is intended to represent various example forms of large-scale data processing devices, such as servers, blade servers, data centers, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762*a*-762*n*. The processors may include data processors, network attached storage devices, and other computer controlled devices. In some implementations, one processor may operate as a master processor and control the scheduling and data distribution tasks. Processors may be interconnected through one or more rack switches 558, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752*a*-752*n*. Data structures, such as an index, may be stored, for example, across storage 756 and memory 754. Computing device 700 may include other components not shown, such as controllers, buses, input/output devices, communications modules, etc.

An entire system, such as the distributed database 102 or the data placement system 101 may be made up of multiple computing devices 700 communicating with each other. For example, device 780*a* may communicate with devices 780*b*, 780*c*, and 780*d*, and these may collectively be known as the distributed database 102 or the data placement system 101. Some of the computing devices may be located geographically close to each other, and others may be located geographically distant. The layout of system 700 is an example only and the system may take on other layouts or configurations.

According to an aspect, a method for data placement in a distributed database includes obtaining access pattern information relating to one or more clients that requested access to data stored in a first regional quorum of replicas located within a first region, where the first regional quorum of replicas includes a first lead replica, identifying a placement algorithm from a configuration file associated with the distributed database, and executing the placement algorithm identified from the configuration file to generate a suggested placement for the data based on the obtained access pattern information, where the suggested placement includes a second regional quorum of replicas located in a second region different than the first region, and the second regional quorum of replicas includes a second lead replica. The method includes transmitting a migration request to the distributed database to transfer the data from the first regional quorum of replicas to the second regional quorum of replicas.

The method may include one or more of the following (or any combination thereof). The configuration file defines a plurality of database digests, where each of the database digests defining a separate grouping of data. The configuration file defines, for each database digest, one or more regional quorums of replicas that are configured to store data associated with a respective database digest. The configuration file identifies one or more first algorithm parameters associated with a first database digest, and one or more second algorithm parameters associated with a second database digest, where, in response to the data being associated with the first database digest, the placement algorithm is executed using the one or more first algorithm parameters. The method may include determining, in an offline analysis, the one or more first algorithm parameters associated with the first database digest based on historical access to the data, and storing the one or more first algorithm parameters for the first database digest in the configuration file. The method may include executing, in an offline analysis, one or more simulations on the historical accesses to determine one or more algorithm parameters of the placement algorithm. The placement algorithm is configured to determine a number of accesses that are received at the second regional quorum of replicas within a first period of time, and identify the second regional quorum of replicas as the suggested placement in response to the number of accesses being greater than a threshold value and determining that the data has not been migrated before a second period of time. The number of accesses, the first period of time, and the second period of time are stored as algorithm parameters for the placement algorithm in the configuration file.

The number of accesses, the first period of time, and the second period of time are values that are optimized using machine-learning resources in an offline analysis. The placement algorithm is configured to identify the second regional quorum of replicas based on location information of the one or more clients, where the location information identifies one or more locations within the second region. The location information includes at least one of global positioning system (GPS) information and Internet protocol (IP) address information. The distributed database stores a first row of data at the first regional quorum of replicas, where the placement algorithm is identified for the first row of data, and the placement algorithm is executed to identify a suggested placement based on access pattern information relating to one or more clients that requested access to the first row of data, and where the migration request is to transfer the first row of data. Each regional quorum of replicas is identified by one or more data centers that include the replicas of a respective regional quorum of replicas. The second region is located on a different continent than the first region. The configuration file includes a place detector configured to generate and update a data center mapping that maps, for each database digest, one or more data centers to each regional quorum of replicas. The configuration file associates the placement algorithm with a database digest that defines a grouping of data that includes the data stored at the first regional quorum of replicas. The method may include executing, using a neural network, one or more simulations in an offline analysis to determine one or more algorithm parameters of the placement algorithm that are optimized for the database digest, and storing the one or more algorithm parameters in the configuration file. Data stored in the distributed database is identified based upon a key value. The key value includes a user identifier associated with the data. In some examples, the embodiments include a computer readable medium carrying a computer program comprising computer readable instructions configured to cause a computer to carry out a method according to any preceding operation. In some examples, the embodiments includes a computer apparatus comprising a memory and one or more processors arranged to read and execute instructions stored in said memory, where said instructions comprise instructions arranged to control the computer to carry out a method according to any one of the preceding operations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for data placement in a distributed database, the method comprising:
    generating access pattern information based on accesses received at the distributed database from one or more end clients that requested access to a first row of data stored in a first regional quorum of replicas located within a first geographical region, the first regional quorum of replicas including a first lead replica;
    selecting a placement algorithm from a configuration file associated with the distributed database, the configuration file defining a data center mapping that maps data centers to geographical regions;
    updating the data center mapping based on network weights, the network weights being determined based on, at least in part, times associated with signals being transmitted from one or more data centers to other data centers identified in a respective geographical region;
    executing the placement algorithm to generate a suggested placement for the first row of data using the access pattern information, the suggested placement identifying second regional quorum of replicas located in a second geographical region different than the first geographical region, the second regional quorum of replicas including a second lead replica; and
    transmitting a migration request to the distributed database to transfer the first row of data from the first regional quorum of replicas to the second regional quorum of replicas.

2. The method of claim 1, wherein the configuration file defines a plurality of database digests, each of the database digests defining a separate grouping of data, the configuration file defining, for each database digest, one or more regional quorums of replicas that are configured to store data associated with a respective database digest.

3. The method of claim 1, wherein the configuration file identifies one or more first algorithm parameters associated with a first database digest, and one or more second algorithm parameters associated with a second database digest, wherein, in response to the first row of data being associated with the first database digest, the placement algorithm is executed using the one or more first algorithm parameters.

4. The method of claim 3, further comprising:
    determining, in an offline analysis, the one or more first algorithm parameters associated with the first database digest based on historical access to data associated with the first database digest; and
    storing the one or more first algorithm parameters for the first database digest in the configuration file.

5. The method of claim 1, wherein the placement algorithm is configured to determine a number of accesses that are received at the first regional quorum of replicas within a first period of time, and identify the second regional quorum of replicas as the suggested placement in response to the number of accesses being greater than a threshold value and determining that the data has not been migrated before a second period of time.

6. The method of claim 5, wherein the number of accesses, the first period of time, and the second period of time are stored as algorithm parameters for the placement algorithm in the configuration file.

7. The method of claim 5, wherein the number of accesses, the first period of time, and the second period of time are values that are optimized using machine-learning resources in an offline analysis.

8. The method of claim 1, wherein the placement algorithm is configured to identify the second regional quorum of replicas based on location information of the one or more end clients, the location information identifying one or more locations within the second geographical region, the location information including at least one of global positioning system (GPS) information or Internet protocol (IP) address information.

9. The method of claim 1, further comprising:
    determining that the first row of data is associated with a first database digest defined in the configuration file, the configuration file identifying a first placement algorithm associated with the first database digest and a second placement algorithm associated with a second database digest, wherein the first placement algorithm is selected from the configuration file in response to the first row of data being determined as associated with the first database digest.

10. An apparatus for data placement comprising:
    a distributed database having a first regional quorum of replicas with a first lead replica located within a first geographical region, and a second regional quorum of replicas with a second lead replica located within a second geographical region, the distributed database storing a first row of data at the first regional quorum of replicas; and
    at least one processor configured to implement:
        a data placement system configured to communicate with the distributed database, the data placement system configured to generate access pattern information based on accesses received at the distributed database from one or more end clients that requested access to the first row of data, the data placement system including:
            a configuration file defining one or more database digests, the configuration file identifying a placement algorithm for each database digest, each database digest defining a separate grouping of data, the configuration file defining a data center mapping that maps data centers to geographical regions;
            a place detector configured to cause the at least one processor to update the data center mapping based on network weights, the network weights being determined based on, at least in part, times associated with signals being transmitted from one or more data centers to other data centers identified in a respective geographical region;
            a place assigner configured to cause the at least one processor to-select the placement algorithm for the first row of data from the configuration file and execute the placement algorithm to identify a suggested placement using the access pattern information, the suggested placement identifying the second regional quorum of replicas, and a place migrator configured to cause the at least one processor to transmit a migration request to the distributed database to transfer the first row of data from the first regional quorum of replicas to the second regional quorum of replicas.

11. The apparatus of claim 10, wherein the configuration file defines, for each database digest, one or more regional quorums of replicas that are configured to store data for a respective database digest, each regional quorum of replicas being identified by one or more data centers that include the replicas of a respective regional quorum of replicas.

12. The apparatus of claim 11, wherein the second geographical region is located on a different continent than the first geographical region.

13. The apparatus of claim 11, wherein the at least one processor is further configured to implement:
an auxiliary file system configured to store historical accesses to data of a database digest; and
a placement algorithm analyzer configured to execute, in an offline analysis, one or more simulations on the historical accesses to determine one or more algorithm parameters of the placement algorithm.

14. The apparatus of claim 11, wherein the network weights include network round-trip time (RTT).

15. The apparatus of claim 11, wherein the placement algorithm is configured to cause the at least one processor to determine a number of accesses that are received at the second quorum of replicas within a first period of time, and identify the second regional quorum of replicas as the suggested placement in response to the number of accesses being greater than a threshold value and to determine the data has not been migrated before a second period of time, wherein the number of accesses, the first period of time, and the second period of time are stored as algorithm parameters for the placement algorithm in the configuration file.

16. The apparatus of claim 11, wherein the at least one processor is further configured to implement:
a placement algorithm analyzer configured to compute a first estimation of latency for access to data of a database digest according to a first placement algorithm, and a second estimation of latency for access to the data of the database digest according to a second placement algorithm,
wherein the placement algorithm analyzer is configured to select one of the first placement algorithm or the second placement algorithm as the placement algorithm based on the first estimation of latency and the second estimation of latency.

17. A non-transitory computer-readable medium storing executable instructions that when executed by at least one processor are configured to cause the at least one processor to:

receive a key value that identifies a first row of data stored in a distributed database, the first row of data being stored in the distributed database at a first regional quorum of replicas located within a first geographical region, the first regional quorum of replicas having a first lead replica configured to perform a lead role in a consensus protocol for database transactions received at replicas of the first regional quorum of replicas;

obtain, in response to the key value, access pattern information related to the first row of data, the access pattern information having been generated based on accesses received at the distributed database from one or more end clients that requested access to the first row of data;

select a placement algorithm from a configuration file associated with the distributed database, the configuration file associating the placement algorithm with a database digest that defines a grouping of data that includes the first row of data stored at the first regional quorum of replicas, the configuration file defining a data center mapping that maps data centers to geographical regions;

update the data center mapping based on network weights, the network weights being determined based on, at least in part, times associated with signals being transmitted from one or more data centers to other data centers identified in a respective geographical region; and execute the placement algorithm to identify a suggested placement for the first row of data based on the access pattern information, the suggested placement including a second regional quorum of replicas located in a second geographical region, the second regional quorum of replicas including a lead replica configured to perform a lead role in a consensus protocol for database transactions received at replicas of the second regional quorum of replicas.

18. The non-transitory computer-readable medium of claim 17, wherein the suggested placement is stored in a storage device associated with the distributed database.

19. The non-transitory computer-readable medium of claim 17, wherein the executable instructions include instructions to:
execute, using a neural network, one or more simulations in an offline analysis to determine one or more algorithm parameters of the placement algorithm that are optimized for the database digest; and
store the one or more algorithm parameters in the configuration file.

20. The non-transitory computer-readable medium of claim 17, wherein the key value includes a user identifier associated with the first row of data.

* * * * *

UNITED STATES PATENT AND TRADEMARK OFFICE
CERTIFICATE OF CORRECTION

PATENT NO. : 11,061,871 B2  
APPLICATION NO. : 16/355112  
DATED : July 13, 2021  
INVENTOR(S) : Awasthi et al.

Page 1 of 1

It is certified that error appears in the above-identified patent and that said Letters Patent is hereby corrected as shown below:

In the Claims

In Column 21, Claim 1, Line 36, delete "second" and insert -- a second --, therefor.

In Column 22, Claim 10, Line 67, delete "replicas," and insert -- replicas; --, therefor.

In Column 23, Claim 12, Line 12, delete "11," and insert -- 10, --, therefor.

In Column 23, Claim 13, Line 15, delete "11," and insert -- 10, --, therefor.

In Column 23, Claim 14, Line 23, delete "11," and insert -- 10, --, therefor.

In Column 23, Claim 15, Line 25, delete "11," and insert -- 10, --, therefor.

In Column 23, Claim 15, Line 28, delete "quorum" and insert -- regional quorum --, therefor.

In Column 23, Claim 16, Line 37, delete "11," and insert -- 10, --, therefor.

In Column 24, Claim 17, Lines 6-8, delete "replica configured to perform a lead role in a consensus protocol for database transactions received at replicas of the first regional quorum of replicas;" and insert -- replica; --, therefor.

In Column 24, Claim 17, Lines 34-37, delete "a lead replica configured to perform a lead role in a consensus protocol for database transactions received at replicas of the second regional quorum of replicas." and insert -- a second lead replica. --, therefor.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*